United States Patent [19]
Osgar et al.

[11] Patent Number: 5,875,921
[45] Date of Patent: Mar. 2, 1999

[54] LIQUID CHEMICAL DISPENSING SYSTEM WITH SENSOR

[75] Inventors: Michael L. Osgar, Eagan; Steven D. Goyette, Minneapolis, both of Minn.

[73] Assignee: Now Technologies, Inc., Bloomington, Minn.

[21] Appl. No.: 815,842

[22] Filed: Mar. 12, 1997

[51] Int. Cl.[6] .................................................. G01F 11/00
[52] U.S. Cl. ................................ 222/1; 222/82; 222/83; 222/105; 222/153.13; 222/383.1
[58] Field of Search .................................... 222/1, 81, 82, 222/83, 83.5, 88, 95, 105, 153.13, 383.1, 386.5, 481.5

[56] References Cited

U.S. PATENT DOCUMENTS

| | | | |
|---|---|---|---|
| 4,557,727 | 12/1985 | Handt | 222/83 |
| 4,921,135 | 5/1990 | Pleet | 222/82 |
| 5,102,010 | 4/1992 | Osgar et al. | 222/1 |
| 5,335,821 | 8/1994 | Osgar | 222/83 |
| 5,435,460 | 7/1995 | Osgar | 222/1 |
| 5,526,956 | 6/1996 | Osgar | 222/83 |
| 5,577,638 | 11/1996 | Takagawa | 222/105 |

FOREIGN PATENT DOCUMENTS

| | | | |
|---|---|---|---|
| 1005866 | 2/1955 | Austria | 222/83 |
| 2092679 | 8/1982 | United Kingdom | 222/386.5 |

*Primary Examiner*—Joseph A. Kaufman
*Attorney, Agent, or Firm*—Kinney & Lange, P.A.

[57] ABSTRACT

The present invention is a system for handling high purity liquid and a method for the same. The system has a container with a mouth. A cap, including a first key element, is coupled with the mouth. A connector is coupled with the cap. The connector includes a connector head, a probe, and a second key element. The probe extends from the connector head and is insertable through a center of the cap and into the mouth of the container. The probe has a flow passage. The second key element is configured to mate with the first key element. The system also includes a pump coupled with the probe and with the flow passage. The pump pumps fluid through the probe and the flow passage. The system also includes a sensor for sensing when the first and second key elements are mated and for sensing when the first and second key elements are not mated. Finally, the system includes a controller coupled with the sensor and the pump. The controller enables the pump when the sensor senses that the first and second key elements are mated and disables the pump when the sensor senses that the first and second key elements are not mated.

16 Claims, 7 Drawing Sheets

LIQUID CHEMICAL DISPENSING SYSTEM WITH SENSOR

BACKGROUND OF THE INVENTION

This invention relates to a dispensing system for storage and dispensing of liquid chemicals including acids, solvents, bases, photoresists, dopants, inorganic, organic, biological solutions, pharmaceuticals, and radioactive chemicals. In particular, the invention relates to using key elements and a sensor to assure proper coupling of a connector member to a container for proper and safe dispersement of liquid chemicals to be drawn out of the container.

Certain manufacturing processes require the use of liquid chemicals such as acids, solvents, bases, and photoresists. Often, these processes require a specific liquid chemical for each particular process. Furthermore, each process may require a specific liquid chemical at various stages of the process. Storage and dispensing systems allow alternative containers to be used to deliver liquid chemicals to a manufacturing process at a specified time. Consequently, manufacturing personnel need to change the liquid chemical being used for the particular process at the specified time so that the system delivers the correct liquid chemical to the manufacturing process. It is critical that the proper liquid chemical be installed into the systems for the particular process. If the incorrect liquid chemical is installed for a particular process, personnel may be put at risk. Furthermore, equipment and the articles under manufacture may be severely damaged.

Prior art systems have attempted to utilize unique pump connectors that will only fit with a correct container. Each container has a unique configuration based on the liquid chemical contained therein. The intention is that only the correct chemical can be used in any particular manufacturing process, because the process will dictate a unique pump connection and a corresponding container with the correct chemical liquid. Prior art systems, however, do allow the pump connectors to be partially connected to the incorrect chemicals such that pumping can take place even though the connection is not proper. In addition, personnel have a propensity to attach the wrong chemical to the wrong process or at the wrong time. Such incorrect connections can be dangerous to personnel and have caused millions of dollars of damage to equipment and to articles of manufacture. The present invention solves these and other problems associated with the prior art systems.

SUMMARY OF THE INVENTION

The present invention is a system for handling high purity liquid and a method for the same. The system has a container with a mouth. A cap, including a first key element, is coupled with the mouth. A connector is coupled with the cap. The connector includes a connector head, a probe, and a second key element. The probe extends from the connector head and is insertable through a center of the cap and into the mouth of the container. The probe has a flow passage. The second key element is configured to mate with the first key element.

The system includes a pump coupled with the probe and with the flow passage. The pump pumps fluid through the probe and the flow passage. A sensor then senses when the first and second key elements are mated and senses when the first and second key elements are not mated. Finally, the system includes a controller coupled with the sensor and the pump. The controller enables the pump when the sensor senses that the first and second key elements are mated and disables the pump when the sensor senses that the first and second key elements are not mated.

In a preferred embodiment, the sensor includes a Hall effect sensor and a magnet. The Hall effect sensor is mounted on the connector and has two states; one state is defined by the Hall effect sensor and the magnet being immediately adjacent each other, and the other state is defined by the Hall effect sensor and magnet being spaced apart from each other.

In a preferred embodiment, the first key element is a notch in the cap and the second key element is a protrusion carried on the connector. The protrusion is configured to mate with the notch in the cap such that the cap and connector can be coupled only in a single predetermined orientation when the protrusion and the notch are mated.

DETAILED DESCRIPTION OF THE PREFERRED EMBODIMENTS

Figures 1, 5:
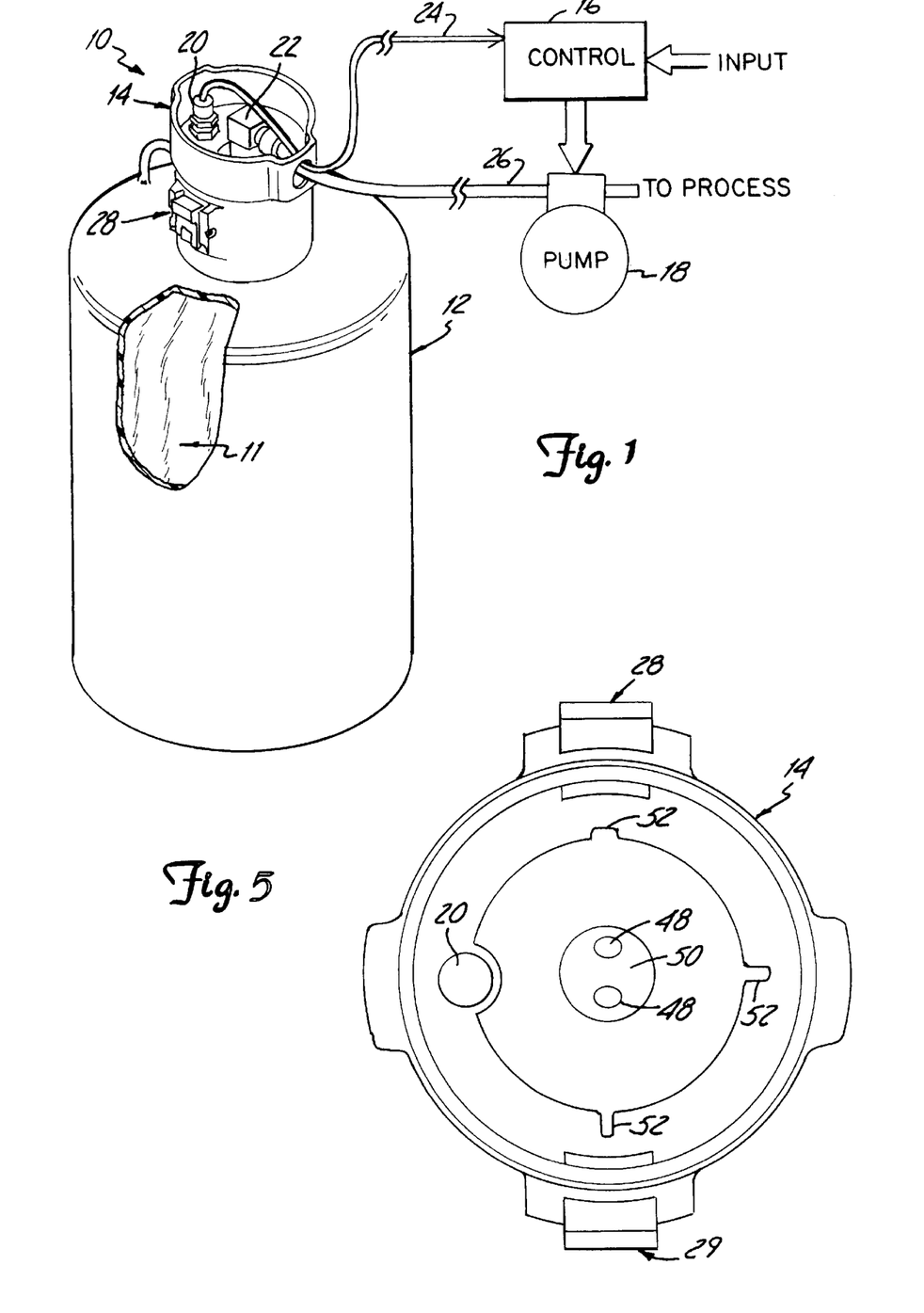
FIG. 1 shows a liquid chemical dispensing system in accordance with the present invention.
FIG. 5 shows a shows a bottom plan view of a connector.

FIG. 1 shows a preferred embodiment of a liquid chemical dispensing system 10 in accordance with the present invention. Dispensing system 10 includes inner container 11, outer container 12, connector 14, control unit 16, and pump 18. Connector 14 includes sensor 20 and port adaptor 22. Sensor line 24 couples sensor 20 to control unit 16. Adaptor tube 26 connects port adaptor 22 to pump 18.

In operation of dispensing system 10, inner container 11 is housed within outer container 12. Inner container 11 is made of a flexible material and outer container 12 is made of a rigid material. Inner container 11 contains a liquid chemical in its interior. For example, inner container 11 may contain a liquid chemical such as photoresist for use in the manufacturing of integrated circuits.

Connector 14 is mounted on outer container 12. Clip 28 aids in securing connector 14 to outer container 12. Additional clips may be used to further secure connector 14 on outer container 12. Adaptor tube 26 and port adaptor 22 provide a fluid passage from the interior of inner container 11 to pump 18. When dispensing system 10 is properly assembled, pump 18 can pump the liquid chemical in inner container 11 through port adaptor 22 and adaptor tube 26 to a manufacturing process, such as the manufacturing of integrated circuits.

The operation of pump 18 is controlled by control unit 16. Control unit 16 may receive input from an operator relating to starting and stopping pump 18. For example, an operator seeking to start pumping the liquid chemical in inner container 11 to a manufacturing process may input this information to control unit 16.

Control unit 16, however, is also configured to receive signals from sensor 20 via sensor line 24. Sensor 20 senses when a proper connection of connector 14 is made with outer container 12. When proper connection is sensed, sensor 20 sends a first signal indicative of a proper connection to control unit 16 on sensor line 24. When an improper connection is sensed, sensor 20 sends a second signal indicative of a improper connection to control unit 16 on sensor line 24. Control unit 16 will only enable pump 18 when sensor 20 sends a first signal indicative of a proper connection. When control unit 16 receives a second signal indicative of a improper connection from sensor 20, control unit 16 will disable pump 18.

Consequently, when dispensing system 10 is not properly assembled and an operator, believing that dispensing system 10 is properly assembled, inputs information to start pump 18, pump 18 will not operate. In this way, dispensing system 10 prevents the accidental operation of an improperly assembled system.

Figure 2:
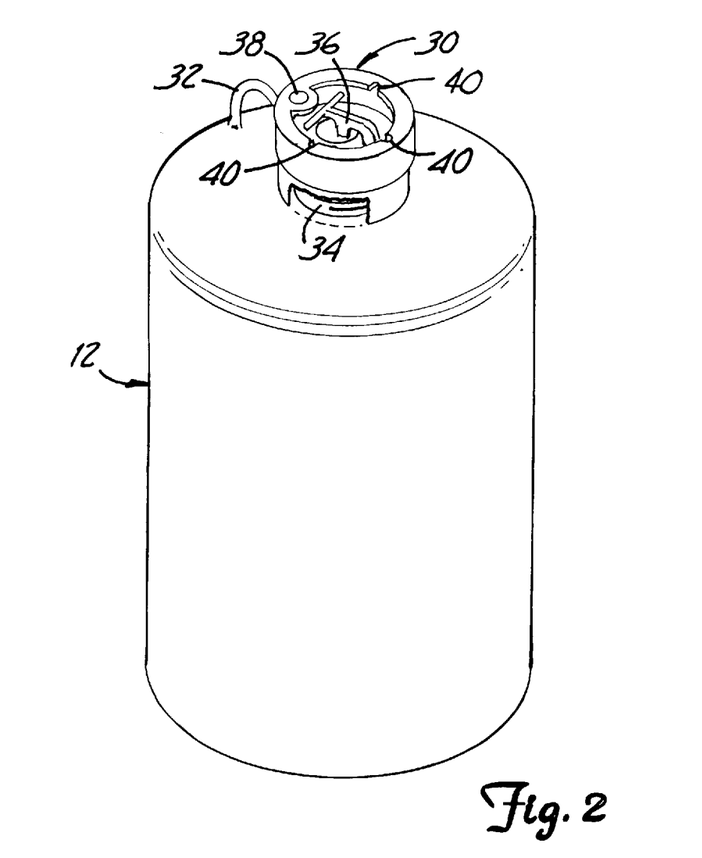
FIG. 2 shows a perspective view of an outer container and a cap.
Figure 3:
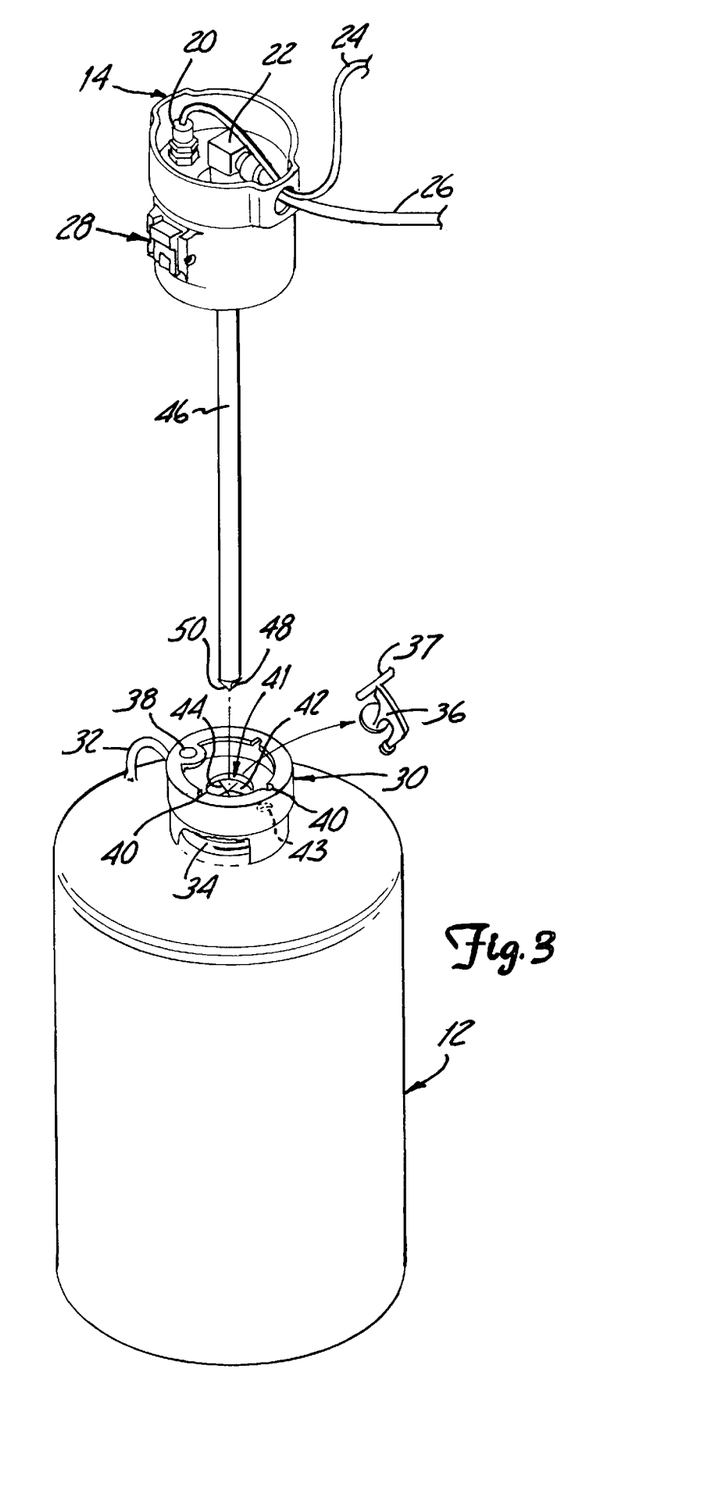
FIGS. 3 and 4 show perspective views of an outer container, a cap, and a connector.
Figure 4:
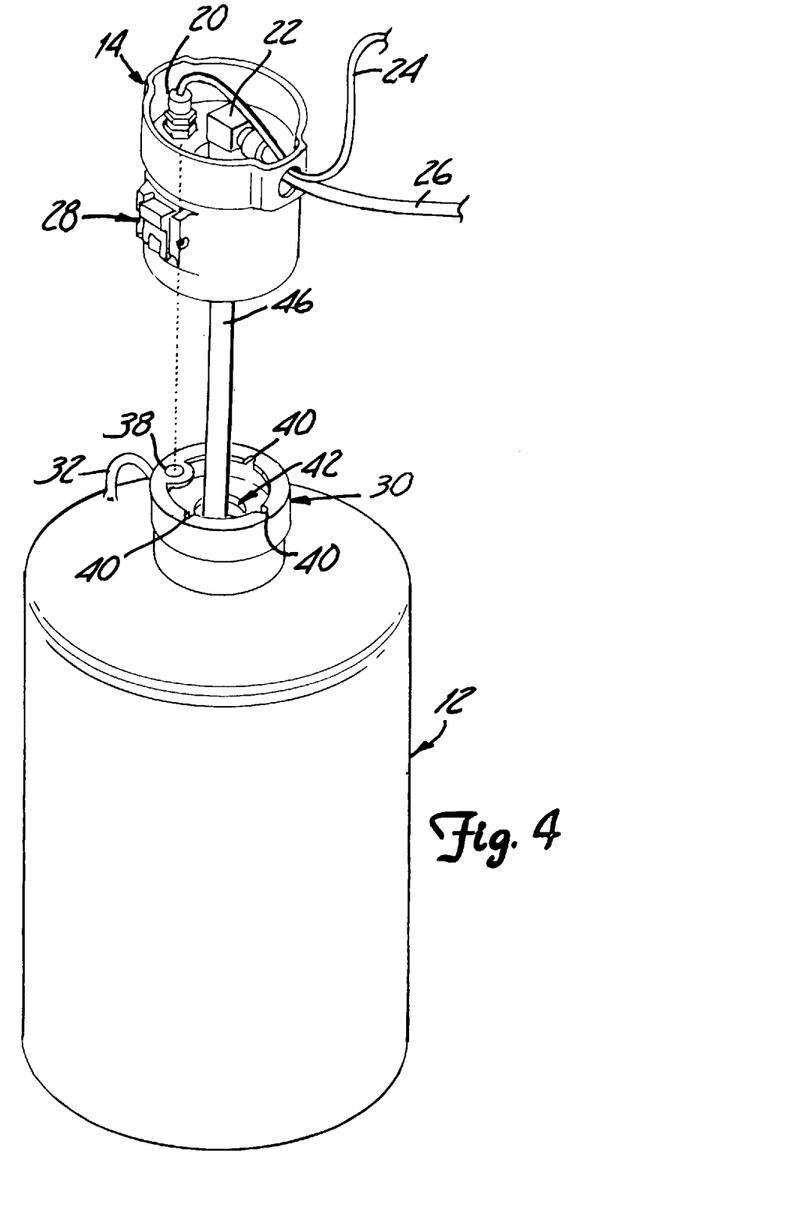

FIGS. 2–4 show a sequence assembling components of dispensing system 10. FIG. 2 shows outer container 12 and cap 30. Outer container 12 includes container transport handle 32 and container mouth 34. Cap 30 includes removable cap handle 36, magnet 38 and cap keys 40. Container mouth 34 is externally threaded. Cap 30 is internally threaded to interconnect with mouth 34. Container transport handle 32 aids in the transporting and handling of outer container 12.

Cap 30 is threadably connected to outer container 12 effectively sealing off inner container 11 and its interior in such a way that liquid chemical contents of inner container 11 cannot escape. Connecting cap 30 with outer container 12 provides an ideal configuration for transportation of high purity fluids without risk of spilling and contamination. Removable cap handle 36 is formed on cap 30 and can be removed to allow access to inner container 11 without removing cap 30. Cap keys 40 are grooves shaped into cap 30. Magnet 38 and cap keys 40 are important to the proper connection of connector 14 to outer container 12, as will be discussed in greater detail below.

FIG. 3 shows a further sequence of assembling components of dispensing system 10. FIG. 3 shows outer container 12, cap 30, and connector 14. Container 12 includes container transport handle 32 and container mouth 34. Cap 30 includes removable cap handle 36 (with handle bar 37), magnet 38, cap keys 40, rupturable membrane 42, and membrane scores 44. Connector 14 includes sensor 20, port adaptor 22, sensor line 24, adaptor tube 26, clip 28, and probe 46. Probe 46 includes lower probe port 48 located adjacent probe tip 50.

Cap 30 is threadably connected to mouth 34 of outer container 12. After outer container 12 with cap 30 are transported to the desired location, removable cap handle 36 is removed from cap 30 by lifting on handle bar 37. Cap 30 is pre-scored such that removing handle 36 from cap 30 opens probe hole 41 and vent hole 43. Rupturable membrane 42 is exposed through probe hole 41. Rupturable membrane 42 has membrane scores 44 in its surface.

Connector 14 is configured to be interconnected with cap 30. FIGS. 3 and 4 show further sequences of assembling components of dispensing system 10. More specifically, connector 14 is shown being interconnected with cap 30 and outer container 12. Probe tip 50 is inserted through probe hole 41 and pressed against rupturable membrane 42 proximate to membrane scores 44. When sufficient pressure is applied on connector 14 toward rupturable membrane 42, probe tip 50 ruptures rupturable membrane 42 along membrane scores 44 allowing probe 46 to be inserted through membrane 42. Continued pressure on connector 14 then allows connector 14 to be moved immediately adjacent cap 30. Probe 46 is then in communication with the interior of inner container 11.

FIG. 1 shows connector 14 fully connected with cap 30 and outer container 12. Probe 46, port adaptor 22, and adaptor tube 26 define a fluid passage that allows fluid to be pumped from the interior of inner container 11, through lower probe port 48, through probe 46, through port adaptor 22, and through adaptor tube 26 to pump 18.

FIG. 5 shows a bottom view of connector 14. Connector 14 includes sensor 20, clip 28, clip 29, lower probe ports 48, probe tip 50, and connector keys 52. Connector keys 52 are protrusions carried on connector 14. Connector keys 52 and cap keys 40 are configured for mating such that they must be properly aligned for connector 14 to be properly connected with cap 30. As indicated in FIG. 4, when connector keys 52 and cap keys 40 are properly aligned for interconnection, sensor 20 will be aligned with magnet 38. Furthermore, when connector 14 is properly connected to cap 30, sensor 20 will also be immediately adjacent magnet 38.

Sensor 20 is configured to send a first signal to control unit 16 on sensor line 24 when sensor 20 is immediately adjacent to, and aligned with, magnet 38. The first signal indicates that connector 14 is properly connected with cap 30. Sensor 20 sends a second signal to control unit 16 on sensor line 24 when sensor 20 is not adjacent magnet 38. The second signal indicates that connector 14 is not properly connected with cap 30.

Control unit 16 monitors sensor line 24 to determine whether connector 14 is properly connected on cap 30. Control unit 16 then controls the operation of pump 18. Control unit 16 accepts input from an operator regarding the operation of pump 18. Control unit 16, however, will not enable the operation of pump 18 unless the first signal is received from sensor 20, indicating that a proper connection between connector 14 and cap 30 is made. Consequently, even if an operator inputs information into control unit 16 attempting to start the operation of pump 18, control unit 16 will not enable pump 18 until the first signal is received from sensor 20. Thus, dispensing system 10 will not allow the operation of pump 18 unless there is a proper connection.

Cap 30 is installed on outer container 12 when inner container 11 is initially filled with liquid chemical. Cap 30 has a unique configuration of cap keys 40 that correspond with the particular liquid chemical in inner container 11. Thus, each liquid chemical has its unique cap 30, with a corresponding unique configuration of cap keys 40. For example, inner container 11 filled with liquid photoresist may have a cap 30 with three cap keys 40, two positioned 180 degrees separated with the third approximately half-way between the other two (shown generally in FIG. 2).

Inner containers 11 filled with other liquid chemicals will have other unique configurations of cap keys 40. For example, a liquid base, may have a cap 30 with two cap keys 40 positioned 30 degrees separated (not shown). It should be noted that single or multiple cap keys 40 may be used to create hundreds of combinations, each corresponding to a particular liquid chemical. Different shapes and widths of cap keys 40 may also be used to further create unique combinations.

Dispensing system 10 utilizes one particular liquid chemical for each manufacturing process step requiring a chemical. Thus, each process step is correlated with a connector 14 with a unique configuration of connector keys 52. Each unique configuration of connector keys 52 then corresponds with a unique configuration of cap keys 40, and thus, each connector 14 corresponds with the particular liquid chemical to be used for that step in the process. In this way, only one unique cap 30 and one unique configuration of cap keys 40 will properly interconnect with one unique connector 14 and one unique configuration of connector keys 52. Thus, only one liquid chemical can be used with one step in the manufacturing process.

For example, a process step that requires the use of liquid photoresist in the manufacture of integrated circuits, will have a connector 14 with three connector keys 52, two positioned 180 degrees separated with the third approximately half-way between the other two (shown generally in FIG. 5). Only a cap 30 with three cap keys 40, two positioned 180 degrees separated with the third approximately half-way between the other two (shown generally in FIG. 2) will properly connect with connector 14 and three connector keys 52. Consequently, only an inner container 11 filled with liquid photoresist can be used in this process step.

It should be recognized that other configurations of cap keys 40 and connector keys 52 may be utilized to perform the present invention. For example, the number of cap keys 40 and corresponding connector keys 52 can vary. Similarly, connector keys 52 may be grooves shaped into connector 14 while cap keys 40 are protrusions carried on cap 30. Also, various shapes may be used, such as wide grooves, narrow grooves, jagged grooves, or sawtooth grooves. Each unique configuration of cap keys 40 will have a corresponding unique configuration of connector keys 52.

One important limitation on the various combinations of cap keys 40 and corresponding connector keys 52 is that none of the combinations overlap with each other. For example, if a single cap key 40 and corresponding connector key 52 configuration is used, the shape of connector key 52 must be such that connector key 52 will not mate with one of the three cap keys 40, such as that in cap 30 shown generally in FIG. 2. Each unique combination of connector keys 52 for each connector 14 must be configured to mate with only one unique combination of cap keys 40 for each cap 30. Likewise, each unique combination of cap keys 40 for each cap 30 must be configured to mate with only one unique combination of connector keys 52 for each connector 14.

Figure 6:
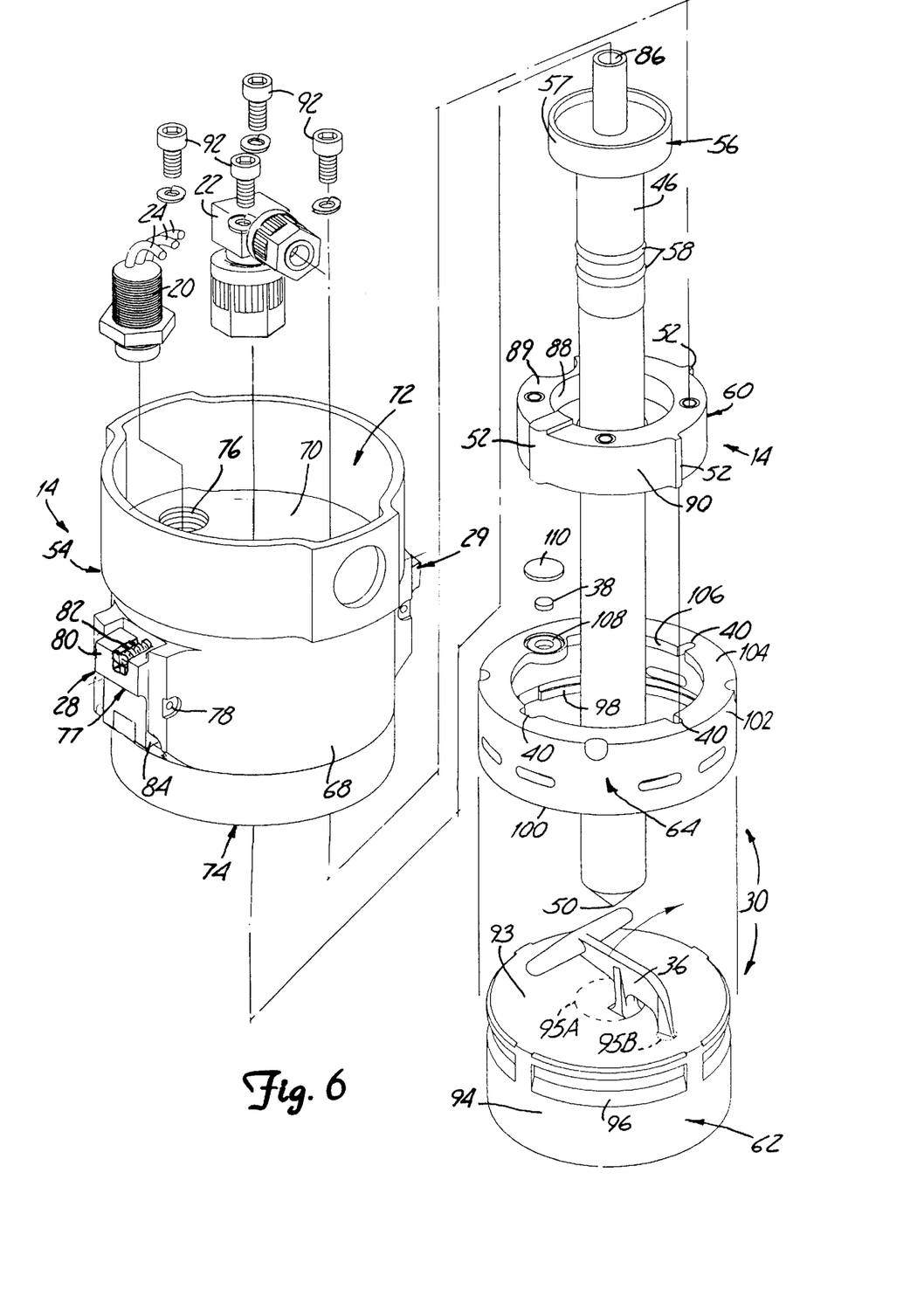
FIG. 6 shows an exploded view of a connector and a cap.

FIG. 6 shows connector 14 and cap 30 in greater detail in an exploded perspective drawing. Connector 14 includes sensor 20, port adaptor 22, connector head 54, clips 28 and 29, probe 46, probe collar 56, O-rings 58, and male connector ring 60.

Connector head 54 is generally cylindrical shaped with an exterior connector surface 68. Connector head 54 includes connector head floor 70 defining upper connector cavity 72 and lower connector cavity 74. Floor 70 further includes sensor mount hole 76.

Sensor 20 is externally threaded and sensor mount hole 76 is internally threaded such that sensor 20 is threadably connectable to connector head 54. Sensor 20 is mounted such that sensor line 24 is connectable to sensor 20 in upper cavity 72. A bottom portion of sensor 20 then extends into lower cavity 74 through connector head floor 70.

Similarly, port adaptor 22 is connectable through floor 70. A bottom portion of port adaptor 22 is then connectable through connector head floor 70 to probe 46 in lower cavity 74. Port adaptor 22 is situated such that adapter tube 26 is connectable to port adaptor 22 in upper cavity 72.

Clips 28 and 29 are mounted on exterior connector surface 68. Clip 28 includes clip body 77, clip pin 78, clip head 80, clip spring 82, and clip base 84. Clip body 77 is rotatable mounted on exterior connector surface 68 on clip pin 78. Clip head 80 is forced away from exterior connector surface 68 by clip spring 82. As pressure is applied to clip head 80 inward toward exterior connector surface 68, clip base 84 moves away from exterior connector surface 68 as clip body 77 rotates on clip pin 78. Connector head 54 is configured such that clip base 84 extends through exterior connector surface 68 into lower cavity 74. Allowing clip base 84 to extend into lower cavity 74 is important to securing connector 14 to cap 30, as will be explained below.

Probe 46 includes upper probe port 86, lower probe ports 48, and probe tip 50. Probe 46 connects through connector head floor 70 with port adaptor 22 at upper probe port 86. Probe collar 56 extends around probe 46 and abuts up against the bottom side of connector head floor 70 in lower cavity 74. Probe collar 56 has an exterior collar surface 57. O-rings 58 extend around probe 46 immediately below probe collar 56.

Male connector ring 60 extends around probe 46 and includes inner ring surface 88, upper ring surface 89, and exterior ring surface 90. Connector keys 52 are carried on exterior ring surface 90. The inner diameter of inner ring surface 88 is greater than the outer diameter of exterior collar surface 57 such that male connector ring 60 fits over probe collar 56. Male connector ring 60 is then mounted against the bottom side of connector head floor 70 with screws 92. Screws 92 are insertable from upper cavity 72 through connector head floor 70 to hold upper ring surface 89 of male connector ring 60 against the bottom surface of connector head floor 70 in lower cavity 74.

Cap 30 includes removable cap handle 36, cap base 62, female cap ring 64, and magnet 38.

Cap base 62 includes removable cap handle 36, upper base surface 93, exterior base surface 94, base scores 95A and 95B, and base grooves 96. Base scores 95A and 95B are formed in upper base surface 93 in circular shapes. When removable cap handle 36 is removed, the portions of upper base surface 93 inside base scores 95A and 95B are removed with handle 36. Rupturable membrane 42 is then exposed through probe hole 41 formed by the removal of upper base surface 93 inside base scores 95A. Vent hole 43 is formed where a portion of upper base surface 93 is removed inside base scores 95B.

Female cap ring 64 includes cap keys 40, ring flanges 98, lower ring surface 100, exterior ring surface 102, tipper ring surface 104, inner ring surface 106, magnet mount recess 108, and magnet cap 110. Ring flanges 98 are configured to mate with grooves 96, which are formed in exterior base surface 94 of cap base 62. Female cap ring 64 and cap base 62 are interconnected utilizing grooves 96 and notches 98 to form cap 30.

Female cap ring 64 is configured to form magnet mount recess 108. Magnet 38 fits within magnet mount recess 108, and magnet cap 110 fits over magnet 38 to hold magnet secure in cap 30. Magnet cap 110 can be further secured over magnet 38 using ultrasonic welding. Cap keys 40 are formed in upper ring surface 104.

In the operation of dispensing system 10, connector 14 is interconnected with cap 30. Removable cap handle 36 is removed and probe 46 is inserted through rupturable membrane 42. Upper ring surface 104 of cap 30 is then moved toward the bottom side of connector head floor 70 of connector 14. Connector head 54 is configured such that female cap ring 64 fits into lower cavity 74 of head 54.

The inner diameter of inner ring surface 106 of female cap ring 64 is slightly greater than the diameter of exterior ring surface 90 of male connector ring 60. Connector keys 52 extend beyond the diameter of inner ring surface 106. Consequently, connector keys 52 prevent male connector ring 60 from fitting inside female cap ring 64 as connector 14 and cap 30 are interconnected. Connector keys 52, however, can be aligned with cap keys 40. Connector keys 52 and cap keys 40 are configured to mate if the connector is compatible with the chemical in inner container 11. Thus, if connector keys 52 and cap keys 40 are aligned, female cap ring 64 will fit over male connector ring 60.

If connector keys 52 and cap keys 40 are not aligned, preventing upper ring surface 104 from reaching the bottom side of connector head floor 70, this is an improper connection between connector 14 and cap 30. If the connector is not compatible with the chemical in inner container 11, it will not be possible to align connector keys 52 and cap keys 40. Enabling of pump 18 with such an improper connection could endanger operators, damage equipment, or produce defective products. Dispensing system 10 will not allow pump 18 to function with such an improper connection.

Sensor 20 is a magnetic sensor, such as a Hall effect sensor. When sensor 20 is in a magnetic field, such as that produced by magnet 38, it produces a first signal. Sensor 20 will produce a first signal when it is next to magnet 38. When sensor 20 is not in a magnetic field, it produces a second signal. Sensor 20 will produce a second signal when it is spaced away from magnet 38. When there is an improper connection between connector 14 and cap 30, connector keys 52 and cap keys 40 are not aligned, upper ring surface 104 is spaced away from the bottom side of connector head floor 70, and thus, sensor 20 is spaced away from magnet 38. In this way, when there is an improper connection between connector 14 and cap 30, sensor 20 produces a second signal. As explained above, control unit 16 receives this signal and disables pump 18.

When there is a proper connection between connector 14 and cap 30, connector keys 52 and cap keys 40 are aligned, upper ring surface 104 is immediately adjacent the bottom side of connector head floor 70, and thus, sensor 20 is immediately adjacent magnet 38. In this way, when there is a proper connection between connector 14 and cap 30, sensor 20 produces a first signal. Control unit 16 receives this signal and enables pump 18.

As one skilled in the art will recognize, varying combinations of configurations of sensors 20 and magnet 38 can be used to achieve the objects of the present invention. For example, sensor 20 could be a mechanically actuated miniature switch such as a microswitch. The microswitch has an mechanical actuator that changes the state of the switch each time the actuator is triggered. Magnet 38 could then simply be a surface that triggers the actuator in the switch when connector keys 52 and cap keys 40 are aligned and upper ring surface 104 is immediately adjacent connector head floor 70. When connector keys 52 and cap keys 40 are not aligned and upper ring surface 104 is removed from connector head floor 70, the actuator of sensor 20 will not be triggered and its state will remain unchanged. Thus, this alternative configuration will provide the alternative states to control unit 16 to enable and disable pump 18.

Various other configurations of sensors 20 and magnet 38 may be used to achieve the objects of the present invention. For example, an optical sensor capable of sensing an optical mark could be used. A mechanical switch triggered by a rigid material could be used. Inductive or capacitive proximity sensors or infrared sensors could be used. Any sensor that senses material type, or lack of material, could be used. Essentially, any configuration that is capable of detecting proper connection of connector 14 and cap 30 can be used.

Similarly, one should recognize that varying combinations of configurations of cap keys 40 and connector keys 52 can be used to achieve the objects of the present invention. For example, connector keys 52 may be grooves shaped into connector 14 while cap keys 40 are protrusions carried on cap 30. Similarly, jagged or sawtooth configurations may be utilized. Each unique configuration of cap keys 40 will have a corresponding unique configuration of connector keys 52.

Figure 7:
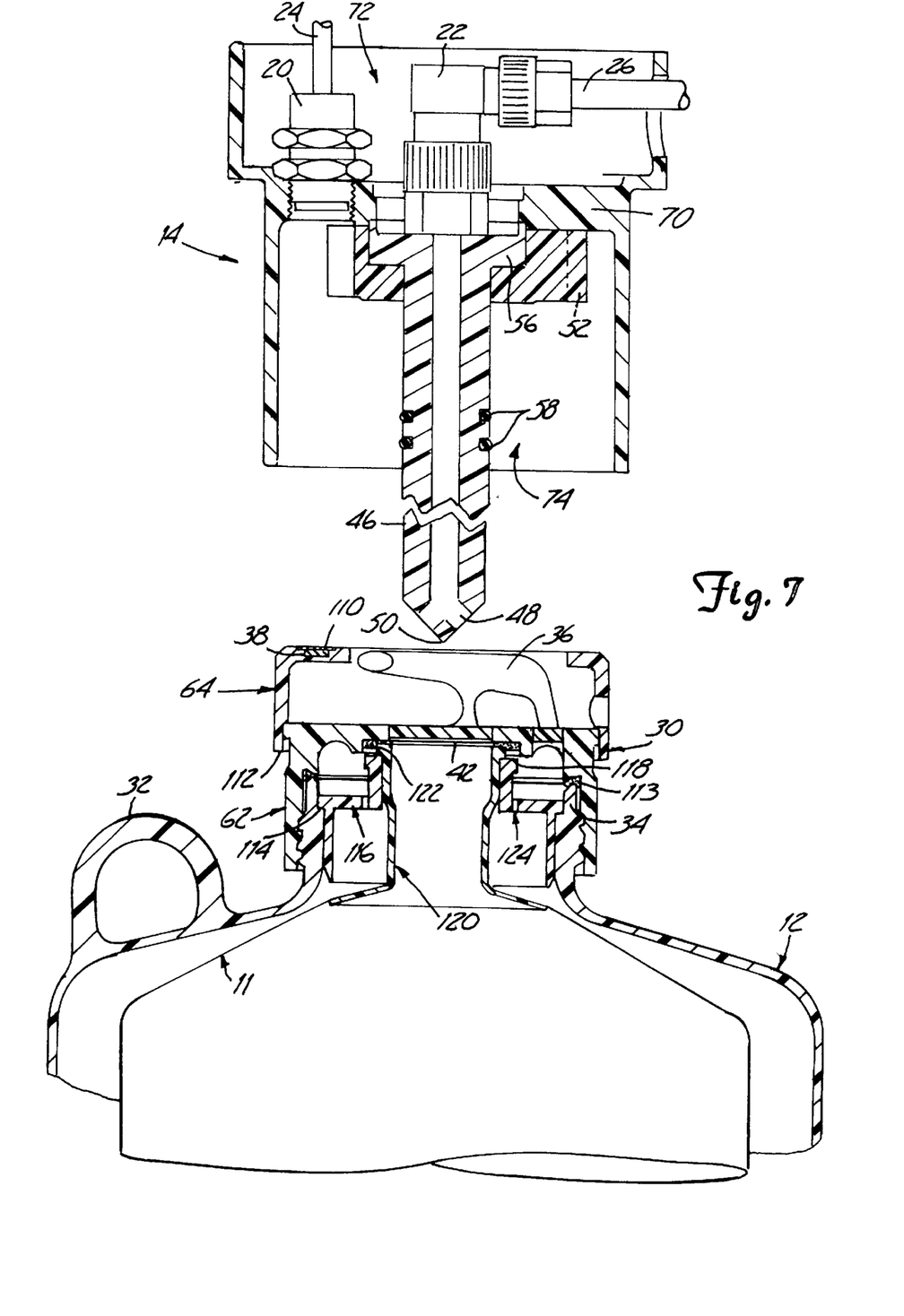
FIGS. 7 and 8 show sectional views of an outer container, a cap, and a connector.
Figure 8:
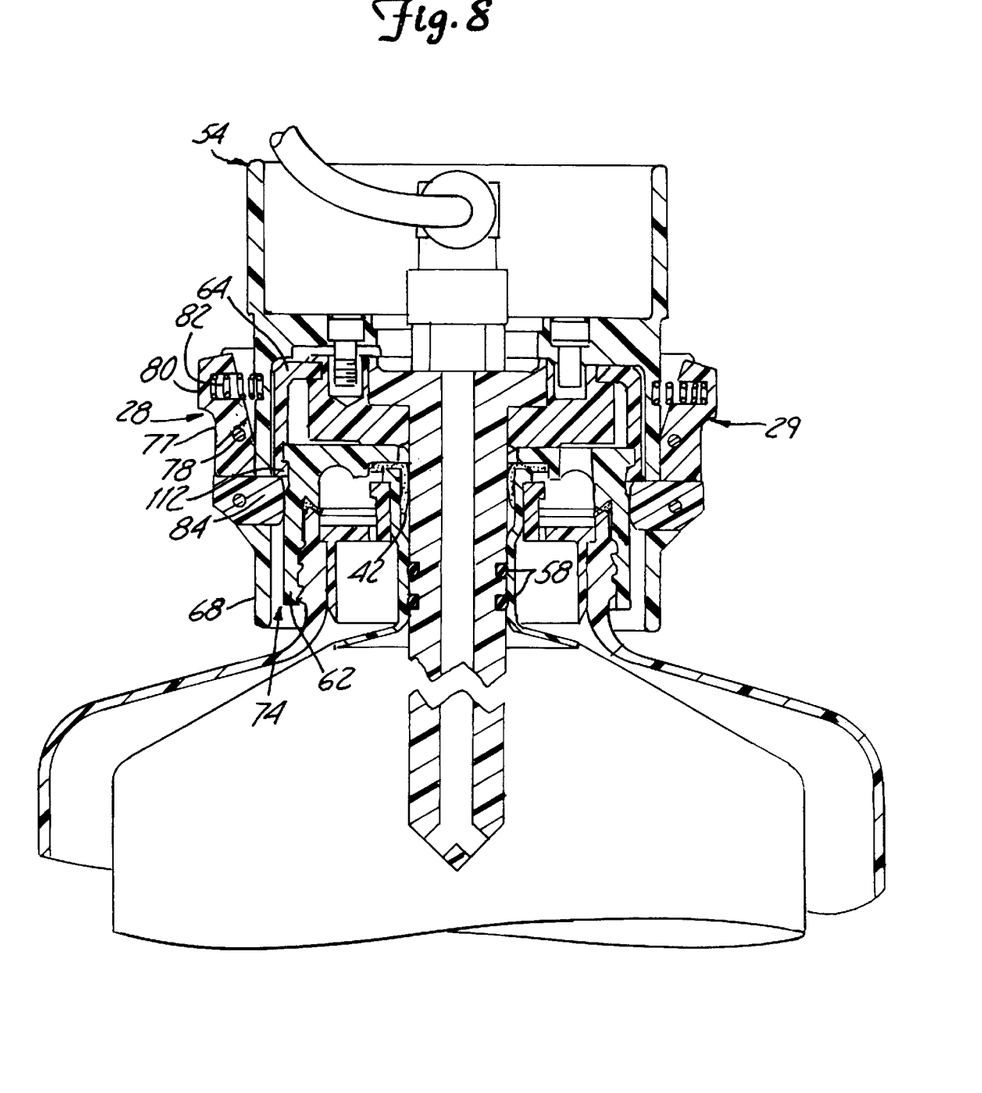

FIGS. 7 and 8 show the sequence of assembling components of dispensing system 10 in cross sectional views, including connector 14, cap 30, and outer container 12. FIG. 7 shows cap 30 before removable handle 36 is removed. FIG. 8 shows connector 14 fully assembled with cap 30 and container 12.

In FIG. 7, Cap 30 is threadably mounted on outer container 12. Container mouth 34 has exterior threads which interconnect with interior threads of cap 30. Cap 30 also includes cap seal 113. Cap seal 113 has a diameter similar to the diameter of mouth 34. In this way, when cap 30 is threadably mounted on outer container 12 over container mouth 34, cap seal 113 provides a seal between cap 30 and outer container 12.

Container mouth 34 is configured to include mouth ledge 114. Retainer 116 is configured to rest on mouth ledge 114 within mouth 34. Retainer 116 includes retainer ledge 118. Fitment 120 is configured to fit within retainer 116 and rest on retainer ledge 118. Fitment 120 forms fitment mouth 122 at its upper end and inner container 11 fits over fitment 120 at its lower end.

As cap 30 is tightened onto outer container 12, rupturable membrane 42 is pressed onto fitment mouth 122, sealing the interior of inner container 11. When removable cap handle 36 is removed from cap 30, rupturable membrane 42 is exposed through probe hole 41. Probe tip 50 may then be pushed through probe hole 41 and urged against rupturable membrane 42. Membrane scores 44 allow rupturable membrane 42 to open into fitment mouth 122 and probe 46 can be moved to the interior of inner container 11.

FIG. 8 shows a cross sectional view of connector 14, cap 30, and outer container 12 where connector 14 is properly connected with cap 30 and outer container 12. Clips 28 and 29 secure the connection between connector 14 and cap 30.

As shown with respect to clip 28, clip body 77 is rotatable mounted on exterior connector surface 68 on clip pin 78. Clip head 80 is forced away from exterior connector surface 68 by clip spring 82. As pressure is applied to clip head 80 inward toward exterior connector surface 68, clip base 84 moves away from exterior connector surface 68 as clip body 77 rotates on clip pin 78. Connector head 54 is configured such that clip base 84 extends through exterior connector surface 68 into lower cavity 74. The diameter of exterior ring surface 102 of female cap ring 64 is greater than the diameter of exterior cap surface 94 of cap base 62 forming ring ledge 112. Clip spring 82 forces clip base 84 against exterior base surface 94 below ring ledge 112. Thus, when connector 14 and cap 30 are properly interconnected, clip base 84 and ring ledge 112 secure connector 14 to cap 30. Inward pressure on clip head 80 will release clip base 84 from ring ledge 112 and allow connector 14 and cap 30 to be separated. Clip 29 functions similarly.

When connector 14 is properly connected with cap 30, probe 46 is disposed within inner container 11 and through fitment 120. O-rings 58 seals the interior of inner container 11 by pressing against the inner walls if fitment 120. Consequently, when pump 18 pumps the liquid chemical out of inner container 11 through probe 46, the interior of inner container 11 is properly sealed.

When removable cap handle 36 is removed from cap 30, vent hole 43 is formed. Vent hole 43 then communicates with retainer vent 124 such that air is allowed to pass from the space between inner container 11 and outer container 12 through retainer vent 124 and through vent hole 41. In this way, inner container 11 is allowed inflate when liquid chemicals are put into inner container 11, and is allowed to deflate when liquid chemicals are pumped out of inner container 11.

Although the present invention has been described with reference to preferred embodiments, workers skilled in the art will recognize that changes may be made in form and detail without departing from the spirit and scope of the invention.

What is claimed is:

1. A high purity liquid handling system comprising:
   a container having a mouth;
   a cap for coupling with the mouth, the cap including a first key element;
   a connector for coupling with the cap, the connector further comprising:
      a connector head;
      a probe extending from the connector head and insertable through a center of the cap and into the mouth, the probe having a flow passage therein; and
      a second key element configured to mate with the first key element;
   pump means coupled with the probe and with the flow passage for pumping fluid through the probe and the flow passage;
   sensor means for sensing when the first and second key elements are mated and for sensing when the first and second key elements are not mated; and
   controller means coupled with the sensor means and the pump means such that the controller enables the pump means when the sensor means senses that the first and second key elements are mated and disables the pump when the sensor means senses that the first and second key elements are not mated.

2. The high purity liquid handling system of claim 1 wherein the sensor means comprises a detector mounted on the connector and a detector affecting element mounted on the cap.

3. The high purity liquid handling system of claim 2 wherein the detector is a Hall effect sensor and the detector affecting element is a magnet, the Hall effect sensor mounted on the connector having two states, one state defined by the Hall effect sensor and the magnet being immediately adjacent each other and the other state defined by the Hall effect sensor and magnet being spaced apart from each other.

4. The high purity liquid handling system of claim 2 wherein the detector is a microswitch sensor with an actuator and the detector affecting element is a rigid surface, the microswitch sensor mounted on the connector having two states, the state switched each time the actuator contacts the rigid surface when the microswitch sensor and the rigid surface contact each other.

5. The high purity liquid handling system of claim 1 wherein the sensor means comprises a detector mounted on the cap and a detector affecting element mounted on the connector.

6. The high purity liquid handling system of claim 5 wherein the detector is a Hall effect sensor and the detector affecting element is a magnet, the Hall effect sensor mounted on the cap having two states, one state defined by the Hall effect sensor and the magnet being immediately adjacent each other and the other state defined by the Hall effect sensor and magnet being spaced apart form each other.

7. The high purity liquid handling system of claim 1 wherein the first key element is a notch in the cap and the second key element is a protrusion carried on the connector, the protrusion configured to mate with the notch in the cap such that the cap and connector can be coupled only in a single predetermined orientation when the protrusion and the notch are mated.

8. The high purity liquid handling system of claim 7 wherein the sensor means comprises a detector mounted on the connector and a detector affecting element mounted on the cap, the detector mounted on the connector having two states, one state when the notch and the protrusion are mated and the cap and connector are coupled in a predetermined orientation and a second state when the notch and the protrusion are not mated and the cap and connector are not coupled in the predetermined orientation.

9. The high purity liquid handling system of claim 1 wherein the first key element is a protrusion carried on the cap and the second key element is a notch in the connector, the protrusion configured to mate with the notch in the connector such that the cap and connector can be coupled only in a single predetermined orientation when the protrusion and the notch are mated.

10. A method of handling high purity liquids, the method comprising:
    providing a container having a mouth which communicates with an interior of the container;
    attaching a cap over the mouth, the cap having a first key element;
    coupling a connector to the cap, wherein the connector includes a probe defining a fluid passage terminating within the interior of the container and wherein the connector has a second key element configured to mate with the first key element;
    sensing whether the first key elements of the cap and the second key element of the connector are properly mated;
    providing a first signal to a pump means when the first and second key element are properly mated, and providing a second signal to the pump means when the first and second key element are not properly mated; and
    dispensing liquid from the container through the probe when the first signal is received and preventing the dispensing of liquid from the container when the second signal is received.

11. The method of claim 10 wherein the step of sensing whether the first key elements of the cap and the second key element of the connector are properly mated includes providing a sensor mounted on the connector and a sensor affecting element mounted on the cap.

12. The method of claim 11 wherein the sensor is a Hall effect sensor and the sensor affecting element is a magnet, the Hall effect sensor mounted on the connector having two states, one state defined by the Hall effect sensor and the magnet being immediately adjacent each other and the other state defined by the Hall effect sensor and magnet being spaced apart from each other.

13. The method of claim 11 wherein the sensor is a microswitch sensor with an actuator mounted on the connector and the sensor affecting element is a rigid surface on the cap, the microswitch sensor having two states, the state of the microswitch switched each time the actuator contacts the rigid surface when the microswitch sensor and the rigid surface contact each other.

14. The method of claim 10 wherein the step of sensing whether the first key elements of the cap and the second key element of the connector are properly mated includes providing a sensor mounted on the cap and a sensor affecting element mounted on the connector.

15. The method of claim 10 wherein the first key element is a notch in the cap and the second key element is a protrusion carried on the connector, the protrusion configured to mate with the notch in the cap such that the cap and connector can be coupled only in a single predetermined orientation when the protrusion and the notch are mated.

16. The method of claim 10 wherein first key element is a notch in the cap and the second key element is a protrusion carried on the connector, the protrusion configured to mate with the notch in the cap such that the cap and connector can be coupled only in a single predetermined orientation when the protrusion and the notch are mated.

* * * * *

UNITED STATES PATENT AND TRADEMARK OFFICE
CERTIFICATE OF CORRECTION

PATENT NO. : 5,875,921
DATED : MARCH 2, 1999
INVENTOR(S) : MICHAEL L. OSGAR ET AL.

It is certified that error appears in the above-identified patent and that said Letters Patent is hereby corrected as shown below:

Col. 6, line 42, delete "tipper", insert --upper--

Signed and Sealed this

Twenty-first Day of March, 2000

Attest:

Q. TODD DICKINSON

*Attesting Officer*     *Commissioner of Patents and Trademarks*

UNITED STATES PATENT AND TRADEMARK OFFICE
CERTIFICATE OF CORRECTION

PATENT NO. : 5,875,921
DATED : MARCH 2, 1999
INVENTOR(S) : MICHAEL L. OSGAR ET AL.

It is certified that error appears in the above-identified patent and that said Letters Patent is hereby corrected as shown below:

Col. 9, line 65, delete "form each other",
insert --from each other--

Signed and Sealed this

Thirty-first Day of October, 2000

Attest:

Q. TODD DICKINSON

*Attesting Officer*   *Director of Patents and Trademarks*